United States Patent
Moller

[15] 3,663,237
[45] May 16, 1972

[54] METHOD OF PRODUCING AN AROMA CONCENTRATE AND THE PRODUCTS OBTAINED THEREBY

[72] Inventor: Hans G. Moller, 345 Holzminden, Hasenrecke 10, Germany

[22] Filed: Feb. 16, 1970

[21] Appl. No.: 11,881

[30] Foreign Application Priority Data

Feb. 22, 1969  Germany ..................... P 19 08 900.0

[52] U.S. Cl. ................................. 99/140 R, 99/229, 99/110
[51] Int. Cl. ................................................................ A23l 1/26
[58] Field of Search ..................... 99/140 R, 110, 22, 229, 3

[56] References Cited

UNITED STATES PATENTS 2,722,482  11/1955  Betts ...................................... 99/140

*Primary Examiner*—Morris O. Wolk
*Assistant Examiner*—Warren Bovee
*Attorney*—Browdy and Neimark

[57] ABSTRACT

A method of producing aroma concentrates by smoking a meaty substance and then extracting with an organic solvent for the smoke flavor produced.

23 Claims, No Drawings

METHOD OF PRODUCING AN AROMA CONCENTRATE AND THE PRODUCTS OBTAINED THEREBY

The present invention relates to methods for the production of aroma concentrates. More particularly the invention relates to aroma concentrates with the odor and taste of smoked bacon and smoked ham. Such concentrates are, for example, suitable for flavoring foodstuffs, animal feedstuff, and pesticides. They can also be used for other purposes, for instance for providing a scent.

The preserving of meat goods by smoking is amongst the oldest methods of preservation. Such smoking fulfills several purposes simultaneously, namely, preservation, coloration, and flavoring. In the present day state of technology the preserving of meat products plays a comparatively small role as compared with flavoring the goods, for other foodstuffs, for example cheese, which have good keeping qualities are also smoked.

In the preparation of foodstuffs, the addition of smoked food materials, particularly smoked bacon and smoked ham endow the foodstuff with a specific taste, which may be highly esteemed by the consumer. These taste components have up to now only been added by the direct addition of smoked meat products because there was no commercially available natural aroma concentrate. The provision of such an aroma concentrate forms one object of the invention which relates to natural smoked goods aroma concentrates and methods for producing them.

The advantages that can be provided by an aroma concentrate in accordance with the invention over previously conventional smoked goods products lie on the one hand in the concentration itself and on the other in the possibilities of handling and using the concentrate. The concentrate can be readily standardized within certain limits as regards strength, yield, and flavor impression. It can be made with all substances necessary for flavoring and without ballast materials. It thus enables the desired flavor to be produced, for instance in foodstuffs, without any change in consistency.

An aroma concentrate in accordance with the invention can be produced in a sterile condition and can also be incorporated in products which would be spoiled by the addition of smoked bacon or smoked ham products. Finally the concentrate can be readily metered out and thus rationalizes operations connected with the flavoring of a large number of different substances, for example, foodstuffs in industry or in the home. It is not necessary to explain in detail that in the case of the use of a smoked ham aroma concentrate it is not necessary to spend the time and trouble necessary for smoking the material to be flavored and the associated technological difficulties no longer arise.

Several different methods of smoking meat goods and other foodstuffs are known which all lead to the same result. For example smoking can be carried out in peat smoke with moderate smoke currents, or the smoking can be carried out over a period of about 3 weeks in the case of ham and sausages with long keeping qualities. Industrial rapid smoking processes use concentrated smoke at 12° to 80° C., the smoking period being less than 8 days. A further method makes use of smoke which is produced with the help of super-heated steam so that there is a rapid smoking of the goods. The preferred woods used for smoke production are oak, beech, hickory, and other hard woods. Aromatic plants may be added. The smoke producing material has a moisture content of 5 to 30 percent. Smoldering combustion is carried out with an excess of atmospheric oxygen either directly or in an industrial plant constructed for the purpose. The precise method of smoking is, however, not essential to the present invention in the sense that any smoking process can be used.

It has been found that the aroma of smoked goods, such as smoked ham and smoked bacon, can be obtained as an extract and concentrated if a smoked product produced in accordance with one of the above methods or another method is extracted with a low boiling point solvent which may then be distilled off. It has also been found that smoked ham aroma can be obtained as a steam distillate by treating the smoked product or the extract with steam and condensing the product which comes over in the steam distillation. This distillate is then extracted with a low boiling point solvent and finally the solvent is distilled off from the extract produced. The extracted solutions are preferably filtered before distilling off the solvent.

In many cases it is convenient to allow a mellowing or fermentation time between smoking of the foodstuff and extraction or steam distillation. Good results have been obtained with a fermentation time of 2 to 4 days, for instance 3 days, at normal room temperature. It is, however, also possible to carry out the fermentation at about 100° C., in which case a period of time of 2 to 4 hours, for instance 3 hours is sufficient. This fermentation brings about a heightening of the flavor and taste so as to resemble the flavor of smoked bacon in the case of smoked products, such a flavor only being obtained otherwise by the use of cold smoke, that is to say smoke between 10° and 40° C. and a considerable period of time. In the case of the use of smoke at a higher temperature this fermentation can be dispensed with. It can also be dispensed with in the case of smoking fish meat.

A smoked ham aroma concentrate obtained in this manner has the full flavor and taste of fresh ham which is obtained by smoking ham meat. In accordance with the fat content of the products to be smoked and the smoking temperature, extracts and concentrates are obtained which possess the savor and taste of fresh smoked ham, bacon and crackling. The concentrate obtained differs from pure condensed smoke as regards its specifically smoked meat character. Such shades of taste could not be obtained previously with any type of smoke concentrate.

Since smoking of meat in the first phase constitutes an absorption, it has been found useful to increase the surface of the product to be smoked by chopping it up. The smoking of the chopped up meat mass is then carried out, conveniently, using turbulent smoke, that is to say, smoke as produced by conventional smoke generators using blowers or fans.

It has been found surprisingly that the smoked and extracted meat mass can be smoked again after a drying process. However, in this case it is always necessary to arrange for a fermentation period to occur before the renewed extraction.

The method in accordance with the invention can also be carried out continuously wherein, for example, chopped and predried meat waste products are smoked in an inclined rotating drum continuously with a pre-set residence or treatment time, following which the products are continuously removed, possibly subjected to a fermentation and then continuously extracted. The smoked and extracted meat mass can then be recirculated to the charging end of the smoking drum, possibly after driving off the solvent. If this continuous method is repeated with two or more circuits of the material, the second and each following smoking stage should be followed by a fermentation stage. The fermentation is preferably carried out in a zone following the smoking drum, where the smoked material is freed from smoke. For the continuous method it has been found particularly convenient to employ a short duration fermentation at a high temperature, for example 3 hours at 100° C., in order to make the course of the process as rapid as possible.

The aroma concentrate obtained in accordance with the invention is a liquid and can readily be incorporated into materials such as sauces, soups, meat goods and fish, and also in cheese together with other materials. Alternatively, the concentrate can be applied to the surface of the material to be flavored. No substantial dilution of the material to be flavored occurs in this case since 1 to 6 grams of concentrate are sufficient for treating 100 kilograms of finished products. The flavoring of, for example, foodstuffs can be carried out directly with the concentrate. However, the concentrate can also be applied in the form of a solution or suspension, for example in water, acidic liquids such as vinegar, alcohol, edible oils, fat, oil-water emulsions and/or other physiologically unobjectionable solvents or liquids. The superficial application of the concentrate to solid base materials can be carried out by spraying or dipping, for instance, of the material to be flavored.

The novel aroma concentrate in accordance with the invention is also completely sound as regards health aspects since it is produced from smoked foodstuffs which are themselves free to be eaten. It is known that in smoked products carcinogenic materials are produced which in part become precipitated on the food material. Smoked products produced by long-established methods after smoking with peat have a 3,4-benzpyrene content of 13 micrograms (Mg) per kilogram of smoked product. In the case of the use of smoke producers which yield a cleaned smoke, for example by scrubbing the smoke, the content limit is 0.2 to 0.3 micrograms of 3,4-benzpyrene per kilogram of smoked material. Tests with a concentrate in accordance with the present invention obtained by extracting smoked goods with methylene chloride, filtration of the extract and evaporation of the solvent have shown that the concentration of 3,4-benzpyrene in the flavored final product only amounted to 0.0005 ppb. This quantity is practically negligible. In the case of enrichment of the smoked ham aroma concentrate by steam distillation of the smoked material and extraction of the distillate, or steam distillation of the solvent extract and subsequent renewed extraction of the steam distillate, there is an additional purifying effect. An aroma concentrate obtained in such a manner is practically completely free of benzpyrene.

Preferred embodiments of the method in accordance with the invention in which an aroma concentrate is produced from meat, fish, their waste products or preparations made from them which are smoked and extracted with an organic solvent for the aroma from the smoked meat or fish, after which the solution is filtered if necessary, incorporate the feature that a low boiling point solvent is used, more particularly a halogenated hydrocarbon with a boiling point not exceeding 100° C. or preferably below 60° C., or lower alkanols with one to four carbon atoms.

Methylene chloride can be used to make possible a particularly rapid extraction and is preferred for industrial application if a fat content in the final product is not found inconvenient. Should a fat content be undesired, the extract can be subjected to steam distillation and then extracted afresh.

If it is desired to avoid the extraction of fat in the course of the process, the use of lower alcohols with one to four carbon atoms is preferred, ethanol being used if the alcoholic extract is to be used directly. It is naturally not possible to use highly water soluble alcohols for the extraction of the steam distillate since there would then be no phase separation.

Preferably the organic solvent used for the extraction is completely distilled off. In the case of subsequent steam distillation it is possible, if there is a sufficient difference in boiling points between the organic solvent and the water, to carry out the steam distillation in such a manner that, firstly, the extraction solvent is driven off and then a steam fraction is caught. If substantial quantities of the aroma have already been driven off with the organic solvent, the same organic solvent can be used subsequently for the extraction of the steam distillate in order to avoid losses of aroma concentrate.

Steam distillation of smoked products and the extraction of the steam distillate are preferred if a practically completely fat-free and very pure aroma concentrate is required. Should fat-containing extracts have to be converted into particularly pure extracts without any fat, steam distillation of the organic solvent extracted and subsequent renewed extraction are recommended.

If an aroma with a pronounced smoked bacon character is desired, the use of a mellowing time of either 2 to 4 days at normal temperature or 2 to 4 hours at about 100° C. is preferred.

For industrial applications the method is preferably carried out continuously, as has already been explained. In this case the material introduced into the smoking chamber should be capable of being poured, in the sense that solid particles can be poured, and not agglomerated. This can be achieved by a suitable pre-drying stage.

The invention is now explained with reference to the following examples:

EXAMPLE 1

10 kg of chopped unsmoked bacon rind were smoked using smoke from a conventional smoke producer, the smoking temperature being 70° to 80° C. and the water vapor content being approximately 20 to 30 percent. When the smoking time had elapsed, the product was divided up into two equal parts which were treated in accordance with the following working procedures (a) and (b):

a. The part (a) was treated two times in a known manner with three times its volume of diethyl ether with vigorous stirring for half an hour each time at 35° C. The organic phase was decanted and filtered and the solvent distilled off carefully from the remaining aroma concentrate.

b. The part (b) was subjected for 60 minutes to steam distillation. The distillate was extracted by shaking with three portions of diethyl ether, the total quantity of ether being 400 ml. The organic phases were bulked and the solvent was distilled off carefully.

The product produced by the procedure (b) was practically free of fat and was approximately ten times more concentrated with respect to aroma than the product in accordance with the working method (a). Both products could be diluted 50,000 to 500,000 times to yield, nevertheless, a good smoke savor and taste, which resembles the flavor of crackling.

EXAMPLE 2a

The working procedure (a) of example 1 was repeated with ethanol and methylene chloride respectively, the other particulars of the method being left unchanged. The products were practically identical with those of example 1a, but the fat content of the extract obtained with ethanol was very low.

EXAMPLE 2b

In accordance with the working procedure (b) of example 1 the steam distillate was extracted with three times its volume of petroleum ether (boiling point range 50° to 70° C.), ethyl acetate and methylene chloride respectively. The products obtained were practically identical to those obtained in the procedure (b) of example 1.

EXAMPLE 3

In a further trial, the products obtained in accordance with example 1a and example 2a were subjected, after evaporating off the organic solvent using a vacuum as produced by a water-jet filter pump, to steam distillation lasting for 1 hour. The steam distillate was taken up in three tests respectively with 300 ml. diethyl ether, 500 ml, methylene chloride and 500 ml. petroleum ether (boiling point range 50° to 70°C.).

After careful evaporation of the solvents using a vacuum sufficient to ensure that a temperature of 50° C. was not exceeded, very pure and potent concentrates were obtained which were practically free of fat and benzpyrene. These aroma concentrates could be diluted 500,000 times.

EXAMPLE 4

10 kg of pigs ears were smoked with smoke from a smoke generator at 30° to 40° C. This smoked product was allowed to rest for 3 days at ambient temperature for fermentation and then treated in accordance with the working procedures (a) and (b) of example 1, the extraction in both cases being carried out with double the quantity of methylene chloride using a Soxhlet extraction apparatus. Both extracts yield the same aroma which, after dilution as described in example 1, tastes and smells like well smoked ham.

EXAMPLE 5

3.5 kg of meat waste products, consisting mostly of belly cuts, were smoked with cold smoke at 10° to 15° C. After fermentation lasting for 3 hours at 100° C. the smoked material was treated in accordance with procedures (a) and (b) of example 1, 7 kg of methylene chloride being used for extraction in each case. The extraction time lasted approximately 3 hours. After dilution both extracts provided a very satisfactory smoked ham aroma.

EXAMPLE 6

5.5 kg of meat waste, consisting mostly of unsmoked bacon rind, were smoked using smoke produced by super-heated steam and wood chips. The smoked product was divided up as described in example 1 into two parts treated in accordance with procedures (a) and (b) of example 1. For the extraction in the method (a) Soxhlet apparatus use was made of 10 kg of isopropanol while in the case of method (b) 5 kg of 1,2-dichloroethylene were used as an extraction solvent. The concentrate obtained in accordance with the two methods (a) and (b) had a smoke character which in flavor was more like that of crackling.

EXAMPLE 7

The extract residue and the residue subjected to steam distillation obtained in the procedures (a) and (b) of example 4 and equal in weight each to 5 kg were dried and then smoked again at 30° to 40° C. After the termination of smoking the product was left 8 days at ambient temperature (approximately 16° to 18° C.) for fermentation. Then each of the two 5 kg charges were processed as in the procedures (a) and (b) of example 1, methylene chloride being used for extraction in EACH case. The concentrates obtained in this manner smelled and tasted also like ham.

EXAMPLE 8

Example 4 was carried out with 10 kg of fish waste as produced in preserving sardines, without, however, the use of a fermentation period. Both the working procedures (a) and (b) provide an aroma concentrate which had a pronounced flavor of smoked fish.

EXAMPLES OF USE:

A. The product of the working procedure (a) of example 1 in a quantity equal to 15 g. was incorporated in 100 kg of fresh liver sausage filling. The sausage produced from the filling had the flavor of smoked liver sausage. In the case of the product of the procedure (b) of example 1 the same flavor character was obtained using 2 g. of aroma per 100 kg of liver sausage filling.

B. 5 g. of the product of example 4a was used in 100 kg of pea soup so as to endow the soup with the smell and taste of a soup cooked with ham or bacon.

C. 50 kg of poison bait wheat as supplied in trade for pest destruction, was wetted with a solution of 7.5 g. of the product of example 6a in 1 liter methylene chloride with thorough mixing. The solvent was allowed to evaporate. The bait wheat had a smell like that of crackling and was taken more readily by mice and rats than wheat bait which had not been so treated.

The same preparation can be carried out with 3 g. of the product of example 8b to yield a good poison bait.

D. 1.5 g. of the aroma concentrate in accordance with the procedure (a) of example 1 were worked into 50 kg of steamed, mashed potatoes. The potatoes were then mixed with 50 kg of rye bran. After mixing to make the mass homogenous, extrusion to make pellets was carried out. The pellets had a smell and taste of crackling and were suitable as dog food. Conventional mineral and vitamin materials can be incorporated.

E. In order to endow leather with the odor of Russian leather, the product of example 1 (procedure (b)) was dissolved in a suitable quantity of water, or more conveniently, an organic solvent with a low boiling point, and sprayed onto the leather, so that 10 to 100 ppm of the product was added to the leather.

It will be obvious to those skilled in the art that various changes may be made without departing from the scope of the invention and the invention is not to be considered limited to what is described in the specification.

What is claimed is:

1. A method for producing an aroma concentrate comprising smoking a meaty substance, extracting with an organic solvent for the smoke flavor produced, and after extraction filtering the solution.

2. A method in accordance with claim 1 wherein the substance is meat or fish.

3. A method in accordance with claim 1 wherein the substance is a meat or fish waste product.

4. A method in accordance with claim 1 wherein the substance is a meat or fish containing product.

5. A method in accordance with claim 1 wherein the smoked product is subjected to steam distillation and the distillate produced is extracted with an organic solvent.

6. A method in accordance with claim 1 wherein the aroma extract is subjected to steam distillation and the resulting distillate is again extracted with organic solvent.

7. A method in accordance with claim 6 wherein the organic solvent is removed before the steam distillation.

8. A method in accordance with claim 1 wherein after smoking the product is allowed to mellow before the aroma is removed.

9. A method in accordance with claim 1 wherein the organic solvent used is distilled partially or totally from the solution of the aroma substance.

10. A method in accordance with claim 1 wherein the surface of the substance to be smoked is increased by chopping up the substance.

11. A method in accordance with claim 10 wherein the material is dried before smoking.

12. A method in accordance with claim 1 wherein the smoke for the smoking of the substance has a temperature between 10° and 80° C. and a water vapor content of 10 to 97 percent.

13. A method in accordance with claim 12 wherein the smoke is produced from wet wood and is used at a temperature between 12° to 35° C. and a water vapor content of 20 to 40 percent.

14. A method in accordance with claim 13 wherein the smoke used for smoking the substance is produced from a hard wood.

15. A method in accordance with claim 14 wherein the wood for producing the smoke is beech, oak or hickory.

16. A method in accordance with claim 1 wherein the smoking is carried out using turbulent smoke.

17. A method in accordance with claim 1 wherein aroma is removed from the substance, and the substance is again smoked and then aroma further removed.

18. A method in accordance with claim 17 which is carried out continuously.

19. A method in accordance with claim 1 wherein the organic solvent used as extraction solvent has a boiling point below 100° C.

20. A method in accordance with claim 19 wherein the solvent has a boiling point below 60° C.

21. A method in accordance with claim 19 wherein a low boiling point halogenated hydrocarbon is used as the solvent.

22. A method in accordance with claim 19 wherein a lower alcohol with one to four carbon atoms is used as extraction solvent.

23. An aroma concentrate produced by the method of claim 1.

* * * * *